(12) United States Patent
Murrow et al.

(10) Patent No.: US 7,624,565 B2
(45) Date of Patent: Dec. 1, 2009

(54) HYBRID WORM GAS TURBINE ENGINE

(75) Inventors: Kurt David Murrow, West Chester, OH (US); Rollin George Giffin, Cincinnati, OH (US); Oladapo Fakunle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 11/742,789

(22) Filed: May 1, 2007

(65) Prior Publication Data

US 2008/0273969 A1    Nov. 6, 2008

(51) Int. Cl.
*F02C 3/02* (2006.01)

(52) U.S. Cl. .................................. 60/39.45; 60/726

(58) Field of Classification Search ............... 60/39.45, 60/726; 418/9, 201.1, 202, 48; 123/241, 123/249

See application file for complete search history.

(56) References Cited

U.S. PATENT DOCUMENTS 1,892,217 A * 12/1932 Moineau et al. ............... 74/458
2,553,548 A * 5/1951 Pawl et al. .................... 123/241
4,144,001 A * 3/1979 Streicher ....................... 418/48
RE30,400 E * 9/1980 Zimmern ..................... 418/188
4,482,305 A * 11/1984 Natkai et al. .................. 418/48
5,605,124 A * 2/1997 Morgan ....................... 123/222
7,530,217 B2 * 5/2009 Murrow et al. ............. 60/39.45

\* cited by examiner

*Primary Examiner*—Michael Cuff
*Assistant Examiner*—Vikansha S Dwivedi
(74) *Attorney, Agent, or Firm*—William Scott Andes; Steven J. Rosen

(57) ABSTRACT

A gas turbine engine has components including a compressor, a combustor, and a turbine. At least one component is radially bladed having at least one row of radially extending rotatable blades and at least another is a worm component having an inner body disposed within an outer body. The inner and outer bodies have offset inner and outer axes, intermeshed inner and outer helical blades wound about the inner and outer axes respectively, and at least one of the inner and outer bodies being rotatable about a corresponding one of the inner and outer axes. An aircraft gas turbine engine has components in serial downstream flow relationship including a fan, a low pressure compressor, a high pressure compressor, a combustor, a high pressure turbine, and a low pressure turbine. At least one of the components is radially bladed and at least one of the components is a worm component.

46 Claims, 20 Drawing Sheets

HYBRID WORM GAS TURBINE ENGINE

BACKGROUND OF THE INVENTION

Field of the Invention

The present invention relates generally to gas turbine engines and, more particularly, to such engines having a combination of radially bladed and axial flow positive displacement worm components.

Gas turbine engines generally have in downstream flow relationship compressor, combustor, and turbine sections. The high and low turbines generally drive the high and low compressors and the low pressure turbine also drives the fan. The combustor burns fuel in an airflow compressed by the compressor to provide energy to the turbines. Gas turbine engines may have one, two, three, or more rotors or spools. In the case of aircraft gas turbine engines, one or two fans upstream of the compressor are driven by one or two turbines as are the compressors. The fans, compressors, and turbines typically include radially extending blades. The function of the gas turbine engine is to provide high energy fluid, which can in turn be harnessed to provide power for a variety of applications. Continuous axial flow gas turbine engines are utilized in a wide range of applications owing in a great deal to a combination of desirable attributes such as high specific energy exhaust stream (energy per unit mass), high mass flow rate for a given frontal area, continuous near steady fluid flow, and reasonable efficiency over a wide range of operating conditions. It is desirable to have light-weight and highly efficient engines. It is desirable to have gas turbine engines with as few parts as possible to reduce the costs of manufacturing, installing, refurbishing, overhauling, and replacing parts of the engine.

BRIEF DESCRIPTION OF THE INVENTION

A hybrid worm gas turbine engine includes at least three gas turbine engine components including in downstream flow relationship a compressor, a combustor, and a turbine. At least one of the gas turbine engine components is a radially bladed component having at least one row of radially extending rotatable blades and at least one of the gas turbine engine components is a worm component. The worm component includes an inlet axially spaced apart and upstream from an outlet, an inner body disposed within an outer body, and the inner and outer bodies extending from the inlet to the outlet. The inner and outer bodies have offset inner and outer axes, intermeshed inner and outer helical blades wound about the inner and outer axes respectively, and at least one of the inner and outer bodies is rotatable about a corresponding one of the inner and outer axes. The inner and outer helical blades extend radially outwardly and inwardly respectively.

The outer body may be rotatable about the outer axis and the inner body rotatable about the inner axis. Alternatively, the outer body may be rotatably fixed about the outer axis and the inner body being orbital about the outer axis. The inner and outer bodies preserve a fixed relationship in both speed and phase. The bodies may be geared together in a fixed gear ratio to accomplish this.

The aircraft hybrid worm engine has gas turbine components including, in serial downstream flow relationship, a fan, a low pressure compressor, a high pressure compressor, a combustor, a high pressure turbine, and a low pressure turbine. The gas turbine components include one or more radially bladed components and one or more helically bladed worm components. The fan, the low pressure compressor, and the low pressure turbine may be radially bladed.

In one embodiment of the engine, the low pressure compressor is the worm component and the high pressure compressor and the high and low pressure turbines are radially bladed. The low pressure turbine is drivingly connected to the worm low pressure compressor and the fan.

In another embodiment of the engine, the high pressure compressor includes a radially bladed upstream section and a worm helically bladed downstream section. The high pressure turbine is radially bladed and drivingly connected to the upstream and downstream sections of the high pressure compressor.

In another embodiment of the engine, the high pressure turbine is helically bladed and drivingly connected to the radially bladed upstream section and the helically bladed worm downstream section of the high pressure compressor.

In another embodiment of the engine, the combustor and the high pressure turbine are helically bladed worm components. The helically bladed worm high pressure turbine is drivingly connected to the radially bladed high pressure compressor and the combustor.

In a triple spool embodiment of the engine, the combustor and the high pressure turbine are helically bladed worm components and the high pressure turbine is drivingly connected to the combustor. A radially bladed intermediate pressure turbine is disposed in flow relationship between the low pressure turbine and is drivingly connected to the radially bladed high pressure compressor. The radially bladed low pressure turbine is drivingly connected to the fan and the low pressure compressor. The combustor and the high pressure turbine may be an integral assembly.

DETAILED DESCRIPTION OF THE INVENTION

Figure 1:
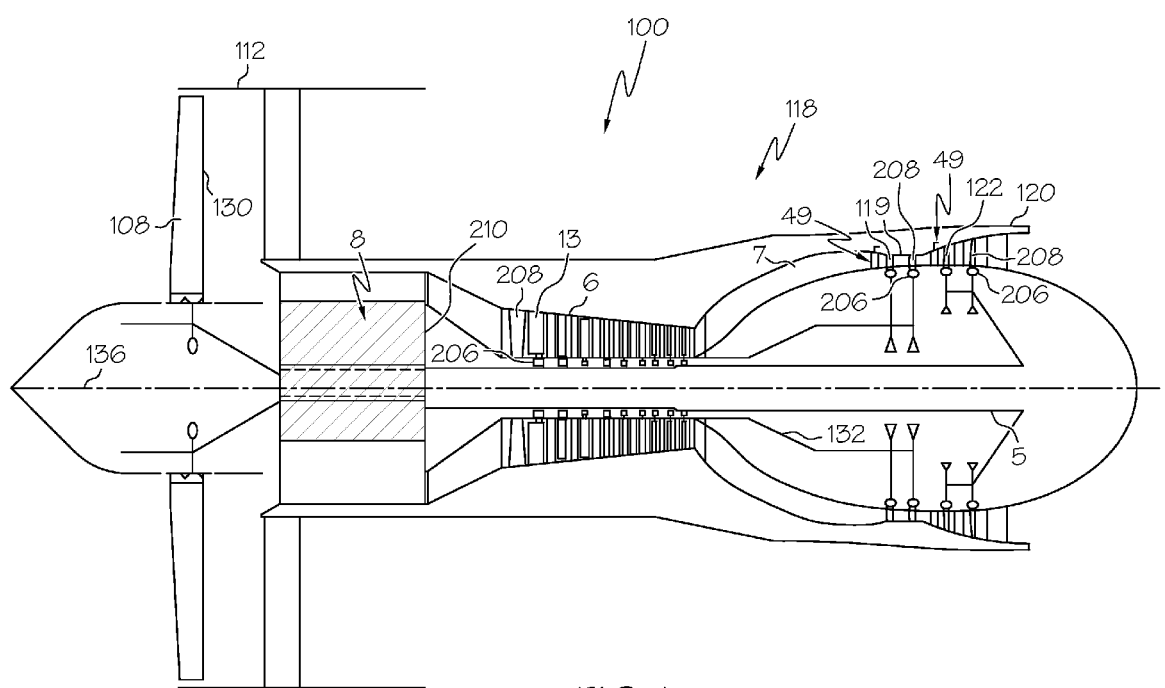
FIG. 1 is a cross-sectional view illustration of an exemplary aircraft hybrid worm gas turbine engine with a worm low pressure compressor.
Figure 12:
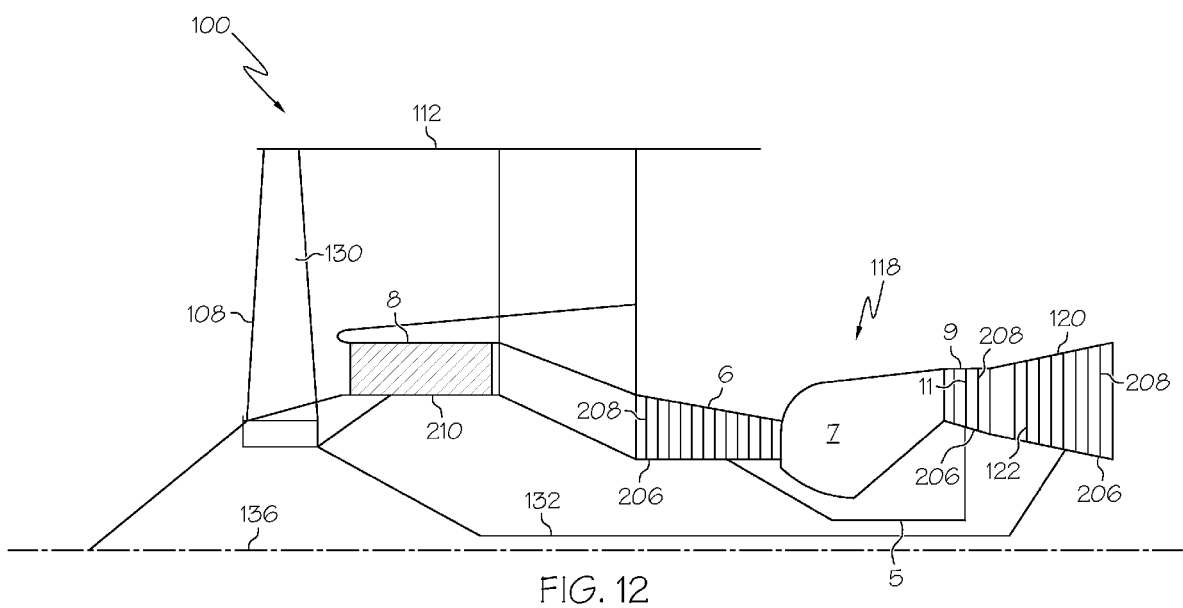
FIG. 12 is a diagrammatic cross-sectional view illustration of the engine illustrated in FIG. 1.

Illustrated in FIGS. 1 and 12 is an exemplary embodiment of an aircraft hybrid worm gas turbine engine 100 having a continuous axial flow positive displacement low pressure compressor 8 which is a worm low pressure compressor. The worm low pressure compressor 8 and a fan 108 in a fan section 112 of the engine 100 are powered by a low pressure turbine (LPT) 120 that produces work to drive the worm low pressure compressor 8 and the fan 108.

The exemplary embodiment of the hybrid worm gas turbine engine 100, illustrated in FIG. 1, is an aircraft gas turbine engine having in downstream serial flow relationship, the fan section 112, the worm low pressure compressor 8, and a core engine 118. The core engine 118 may be referred to as a gas generator. The core engine 118 includes, in downstream serial flow relationship, a high pressure compressor 6 having high pressure compressor blades 13, a combustor 7, and a high pressure turbine 9 having high pressure turbine blades 11 and drivingly connected to the high pressure compressor 6 by a high pressure shaft 5. The core engine 118 or gas generator may be used to directly drive power consuming devices such as marine propulsion drives and electrical power generators or aircraft nozzles or fans.

Combustion gases are discharged from the core engine 118 into the low pressure turbine (LPT) 120 having a row of low pressure turbine rotor blades 122. The low pressure turbine rotor blades 122 are drivingly attached to a row of circumferentially spaced apart fan rotor blades 130 of the fan 108 in the fan section 112 and to the worm low pressure compressor 8 by a low pressure shaft 132 to form a low pressure spool circumscribing an engine centerline 136. The worm low pressure compressor 8 may be used in other applications including, but not limited to, ground based industrial and marine gas turbine engines.

The fan rotor blades 130, the high pressure compressor blades 13, the high pressure turbine blades 11, and the low pressure turbine rotor blades 122 are radially extending rotatable blades 208 in the exemplary embodiment of the hybrid worm gas turbine engine 100 illustrated in FIGS. 1 and 12. A hybrid worm gas turbine engine includes at least three gas turbine engine components. These three gas turbine engine components are defined herein in downstream flow relationship as, at least one compressor, at least one combustor, and at least one turbine. At least a first one of these three components is radially bladed having at least one row 206 of radially extending rotatable blades 208 and at least a second one of these three components is a worm component 210.

Figure 2:
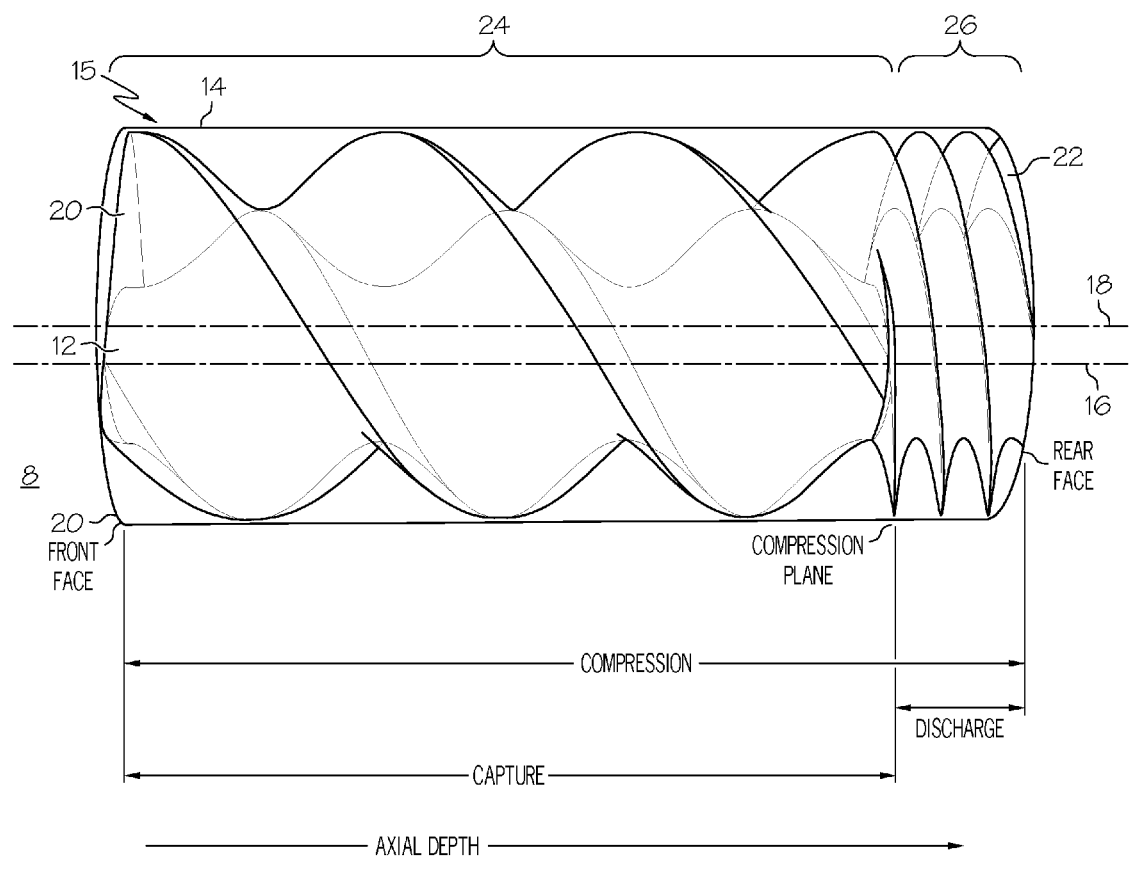
FIG. 2 is a diagrammatic cross-sectional view illustration of the worm low pressure compressor illustrated in FIG. 1.
Figure 3:
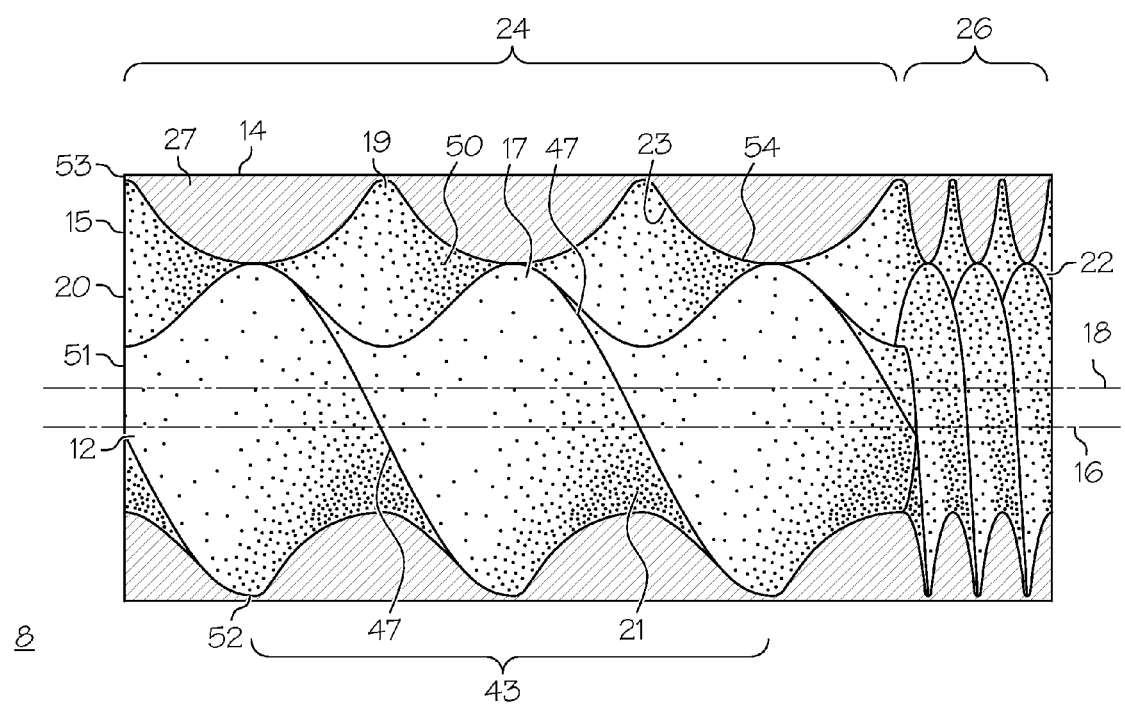
FIG. 3 is a diagrammatic partially cut away perspective view illustration of helical blade portions of inner and outer bodies of the worm low pressure compressor illustrated in FIG. 2.

Referring to FIGS. 2 and 3, the worm component 210 is helically bladed and has an inlet 20 axially spaced apart and upstream from an outlet 22 and an inner body 12 disposed within an outer body 14. The inner and outer bodies 12, 14 extend from the inlet 20 to the outlet 22. The inner and outer bodies 12, 14 have offset inner and outer axes 16, 18 respectively, and at least one of the inner and outer bodies 12, 14 is rotatable about a corresponding one of the inner and outer axes 16, 18. The inner and outer bodies 12, 14 have intermeshed inner and outer helical blades 17, 27 wound about the inner and outer axes 16, 18 respectively, and the inner and outer helical blades 17, 27 extend radially outwardly and inwardly respectively. The inner body 12 is disposed within a cavity 19 of the outer body 14.

Either or both bodies may be rotatable and, if both bodies are rotatable, they rotate in the same circumferential direction clockwise or counterclockwise at different rotational speeds determined by a fixed relationship. If only one body is rotatable, then the other body is fixed. In one embodiment of the generator, the inner body 12 is rotatable about the inner axis 16 within the outer body 14, and the outer body 14 may be rotatably fixed or rotatable about the outer axis 18.

The inner and outer bodies 12, 14 have intermeshed inner and outer helical elements wound about the inner and outer axes 16, 18, respectively. The elements are inner and outer helical blades 17, 27 having inner and outer helical surfaces 21, 23, respectively as illustrated in FIG. 3. The term worm is used because it is descriptive of the helical elements wound about the inner and outer axes 16, 18. The inner helical blades 17 extend radially outwardly from a hollow inner hub 51 of the inner body 12 and the outer helical blades 27 extend radially inwardly from an outer shell 53 of the outer body 14. An inner helical edge 47 along the inner helical blade 17 sealingly engages the outer helical surface 23 of the outer helical blade 27 as they rotate relative to each other. An outer helical edge 48 along the outer helical blade 27 sealingly engages the inner helical surface 21 of the inner helical blade 17 as they rotate relative to each other.

Figure 4:
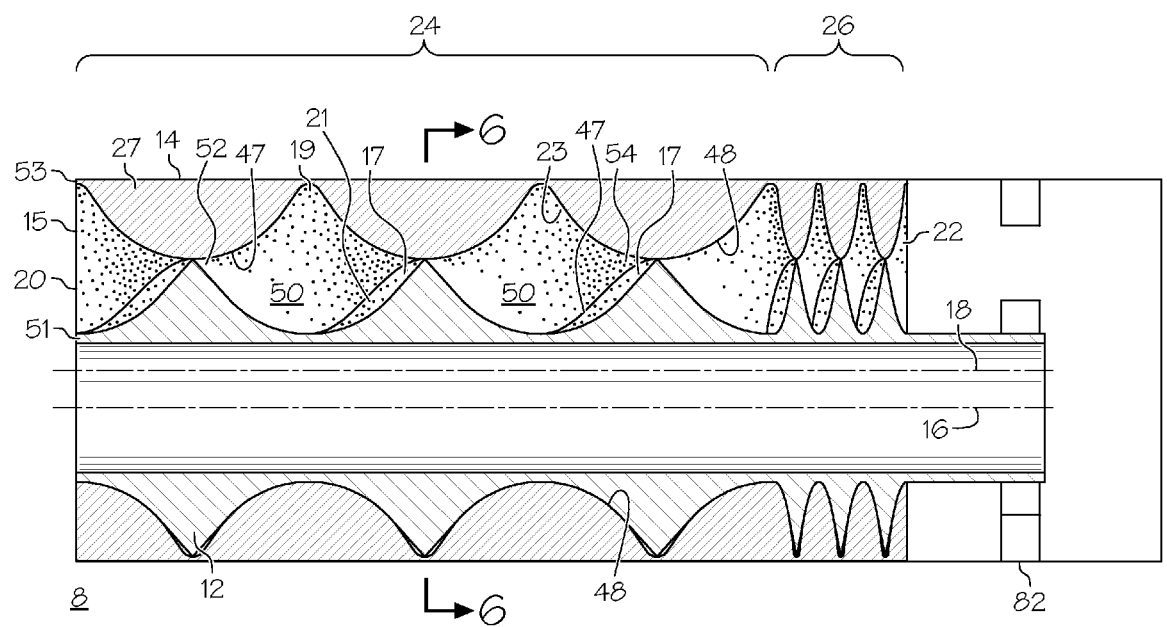
FIG. 4 is a diagrammatic cross-sectional view illustration of gearing between inner and outer bodies of the worm low pressure compressor illustrated in FIG. 3.

Illustrated in FIG. 4 is a longitudinal cross-section taken through the inner and outer bodies 12, 14. The inner and outer bodies 12, 14 are illustrated in axial cross-section in FIG. 6. The inner body 12 is illustrated herein as having two inner body lobes 60 which correspond to two inner helical blades 17 and which results in a football or pointed oval-shaped inner body cross-section 69. The outer body 14 has three outer body lobes 64 which corresponds to three outer helical blades 27 (illustrated in FIGS. 3 and 4). Note that 3 sealing points 62 between the inner and outer bodies 12, 14 are illustrated in FIG. 6 but that there is continuous sealing between the inner and outer helical blades 17, 27 along the length of the inner and outer bodies 12, 14.

Figure 7:
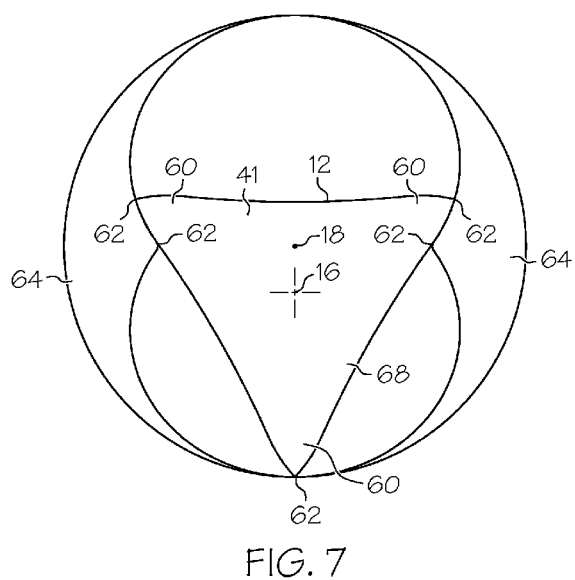
FIGS. 7-10 are diagrammatic cross-sectional view illustrations of an alternate inner and outer body configuration at different relative angular positions.
Figure 8:
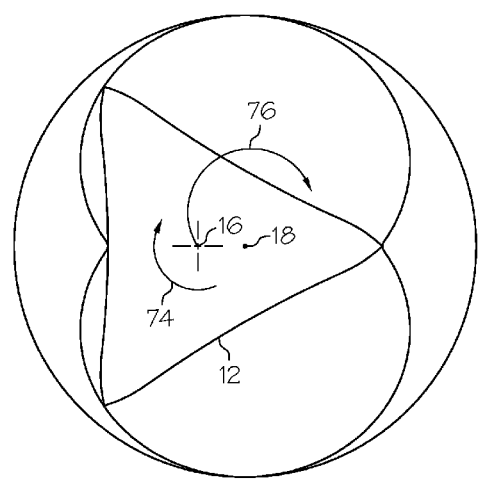
Figure 9:
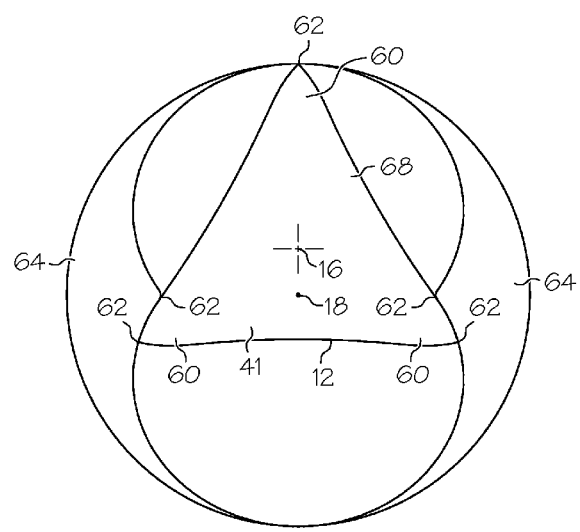
Figure 10:
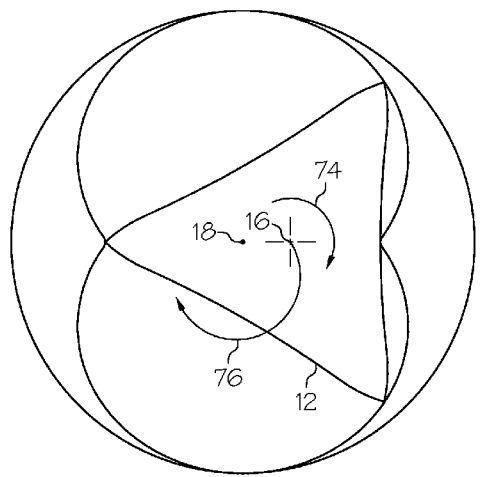
Figure 11:
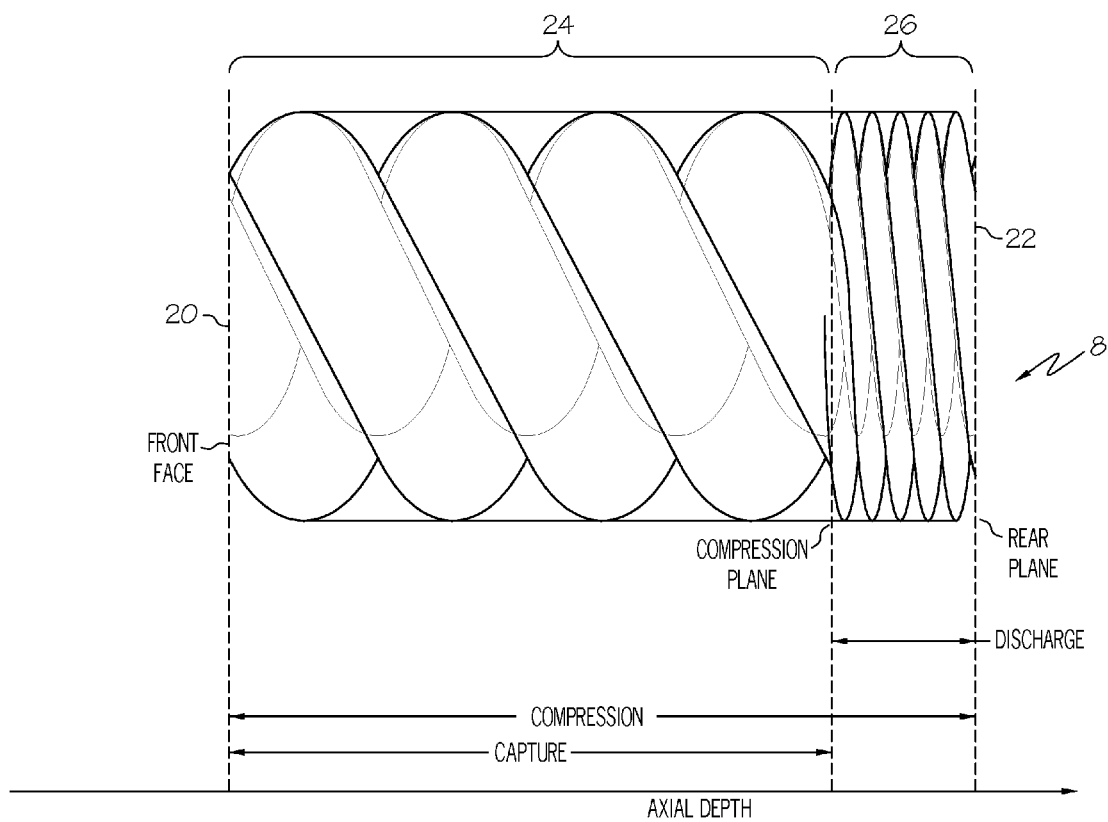
FIG. 11 is a diagrammatic cross-sectional view illustration of the positive displacement continuous axial flow low compressor with the inner and outer bodies illustrated in FIG. 1.

An alternative configuration of the inner and outer bodies 12, 14 is illustrated in cross-section in FIGS. 7-10. The inner body 12 is illustrated therein as having three inner body lobes 60 which correspond to three inner helical blades 17 which results in a triangularly-shaped inner body cross-section 68 as illustrated in FIG. 7. The outer body 14 has two outer body lobes 64 which corresponds to two outer helical blades 27. In general, if the inner body 12 has N number of lobes, the outer body 14 will have N+1 or N−1 lobes. Note that 5 sealing points 62 between the inner and outer bodies 12, 14 are illustrated in FIG. 7 but that there is continuous sealing between the inner and outer helical blades 17, 27 along the length of the inner and outer bodies 12, 14.

Figure 5:
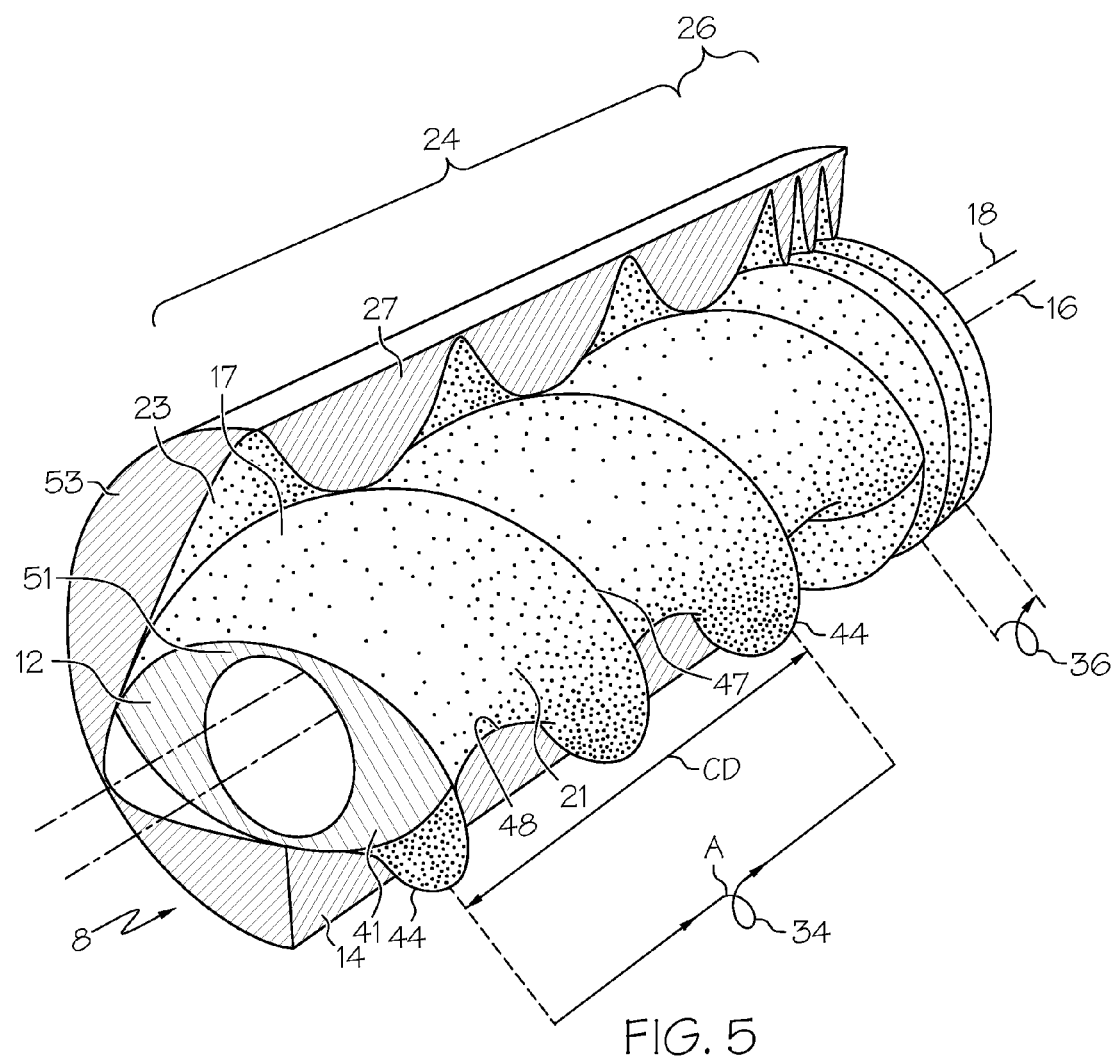
FIG. 5 is a diagrammatic cut away perspective view illustration of the helical blade portions of the inner and outer bodies of the worm low pressure compressor illustrated in FIG. 3.
Figure 6:
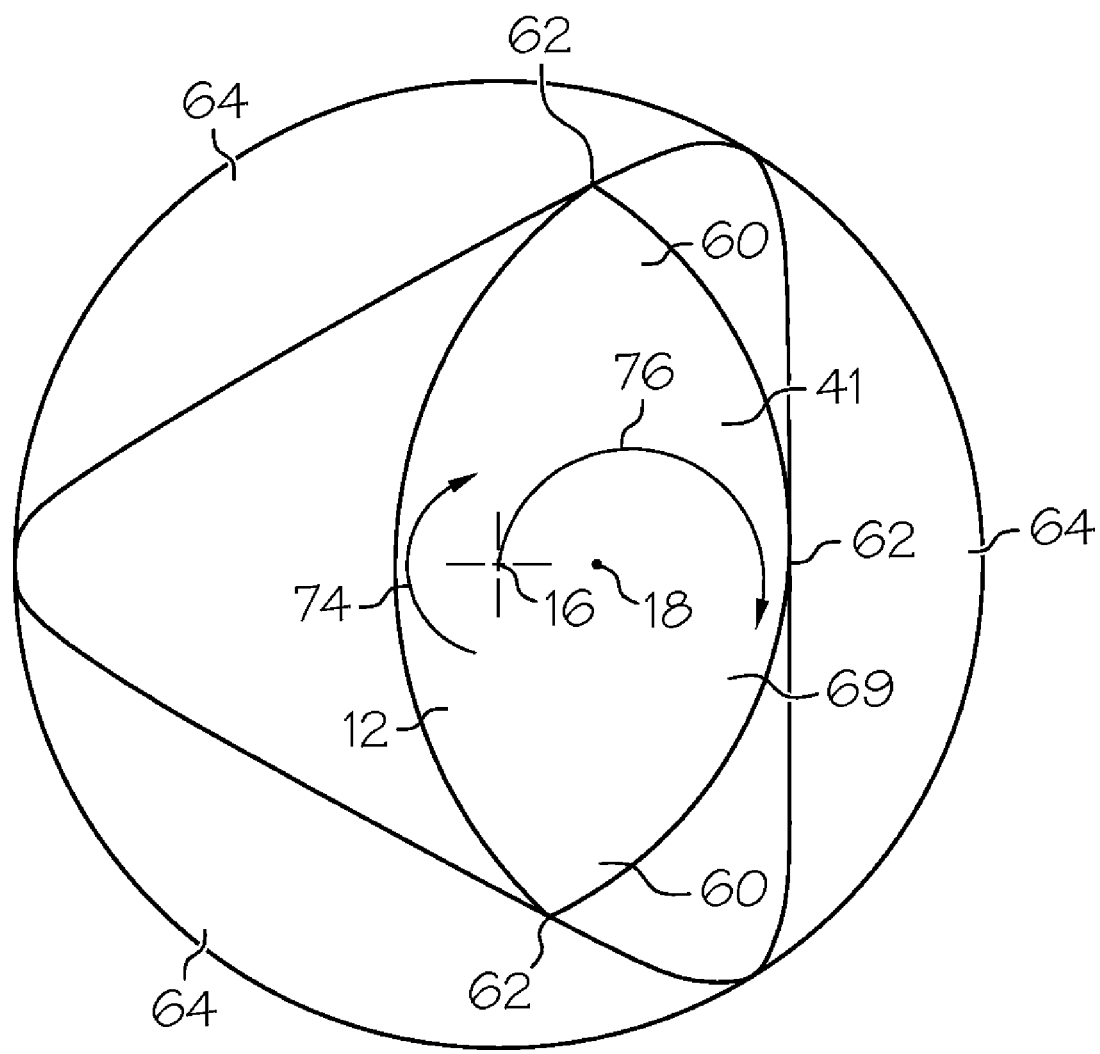
FIG. 6 is a diagrammatic cross-sectional view illustration of the inner and outer bodies taken through 6-6 in FIG. 4.

Referring to FIG. 5, the inner and outer helical blades 17, 27 have constant twist slopes A defined as the amount of rotation of a cross-section 41 of the helical element (such as the oval-shaped or triangularly-shaped inner body cross-sections 69, 68 illustrated in FIGS. 6 and 7, respectively) per distance along an axis such as the inner axis 16 as illustrated in FIG. 5. Illustrated in FIG. 5 is 360 degrees of rotation of the inner body cross-section 41. The twist slope A is also 360 degrees or 2 Pi radians divided by an axial distance CD between two adjacent crests 44 along the same inner or outer helical edges 47, 48 of the helical element such as the inner or outer helical blades 17, 27 as illustrated in FIG. 5. The axial distance CD is the distance of one full turn 43 of the helix.

For the fixed outer body 14 embodiment, the inner body 12 is cranked relative to the outer axis 18 so that as it rotates about the inner axis 16, the inner axis 16 orbits about the outer axis 18 as illustrated in FIGS. 7-10. The inner body 12 is illustrated as having been rotated about the inner axis 16 from its position in FIG. 7 to its position in FIG. 8, and the inner axis 16 is illustrated as having orbited about the outer axis 18 about 90 degrees. The inner and outer bodies 12, 14 are geared together so that they always rotate relative to each other at a fixed ratio as illustrated by gearing in gearbox 82 in FIGS. 1 and 4. Gearing together of the inner and outer bodies 12, 14 distributes power and retains an appropriate phasing between the bodies.

If the outer body 14 in FIG. 7 was not fixed, then it would rotate about the outer axis 18 at 1.5 times the rotational speed that the inner body 12 rotates about the inner axis 16. The inner body 12 rotates about the inner axis 16 with an inner body rotational speed 74 equal to its orbital speed 76 divided by the number of inner body lobes. The number of inner lobes are equal the number of blades. If the inner body 12 rotates in the same direction as its orbital direction, a 2 lobed outer body configuration is used. If the inner body 12 rotates in an opposite orbital direction, a 4 lobed outer body configuration is used.

The twist slopes of the outer body 14 are equal to the twist slopes of the inner body 12 times the number of inner body lobes N divided by the number of outer body lobes M. For the configuration illustrated in FIGS. 7-10 having three inner lobes or inner helical blades 17 and two outer lobes or outer helical blades 27, it takes 900 degrees of rotation of the outer body 14 and 600 degrees of rotation of the inner body 12 to mechanically capture one of the charges of air 50.

The continuous axial flow positive displacement compressor, referred to herein as a worm low pressure compressor 8, may be used in a wide range of applications and provides high specific energy exhaust stream (energy per unit mass), high mass flow rate for a given frontal area, continuous near steady fluid flow, and reasonable efficiency over a wide range of operating conditions. It is light-weight and highly efficient and has far fewer parts as compared to other axial compressors, which in turn reduces the costs of manufacturing, installing, refurbishing, overhauling, and replacing the compressor.

A first mode of the operation of the worm component 210 disclosed herein is the inner and outer bodies 12, 14 both rotating about the inner and outer axes 16, 18, respectively. The first mode avoids introducing a centrifugal rotor whirl effect on a support of the compressor and core engine. The outer body 14 remains static and the inner body 12 simultaneously orbits the outer body's geometric center which is the outer axis 18 and spins about the instantaneous inner body's geometric center which is the inner axis 16. The first mode eliminates the introduction a centrifugal rotor whirl effect on the support system. A second mode of the operation of the worm component 210 is only one of the inner and outer bodies 12, 14 rotating about the inner and outer axes 16, 18, respectively requiring only a single rotor, potentially simplifying the mechanical design process.

Aircraft gas turbine engines designed with high overall pressure ratios are desirable for applications with substantial subsonic cruise content in order to keep fuel consumption low. For these engines, a low fan pressure ratio is also desirable to achieve high propulsive efficiency and further reduce fuel consumption. To compensate for low levels of compression in the fan, a low pressure compressor (LPC) is typically placed at the inlet to the core engine to raise core inlet pressure. During off-design operation, core engine airflow drops faster than the airflow supplied by the low pressure compressor. This results in back-pressurization of the LPC, and can lead to part power aerodynamic stall in conventional LPC's. Variable bleed valves (VBVs) placed behind the LPC to increase the effective downstream area and maintain an acceptable LPC operating line at part power may be used avoid this phenomenon.

The low pressure worm compressor illustrated herein is designed to provide a peak efficiency supercharging pressure ratio to the core that is extremely flat with a low pressure shaft speed relative to a conventional LPC. The worm compressor has the potential of having a stall line well above that of a conventional LPC. This would produce stall margins that may be as much as twice or more than that of conventional LPCs. This change should alleviate part power effects on the LPC operating line, and possibly eliminate the need for variable bleed valves. In the event that the operating line is still elevated at part power, it is anticipated that the worm compressor is not susceptible to aerodynamic stall due to its positive displacement attributes, and the flow function variability and allowable relative loading swing on the LPT from high to low power would dictate the maximum operating line on the LPC.

Figure 13:
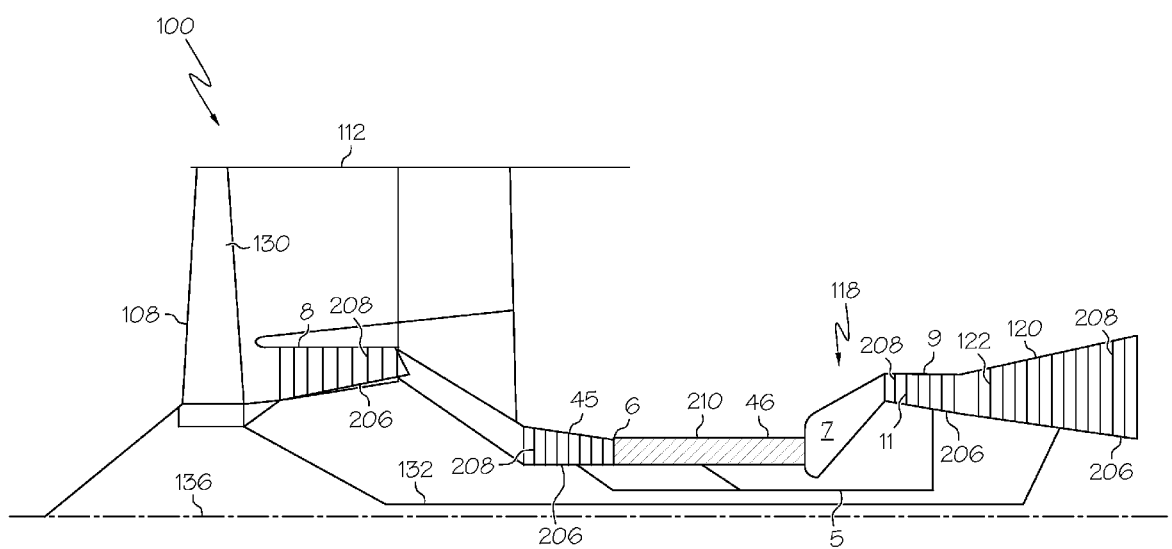
FIG. 13 is a diagrammatic cross-sectional view illustration of an exemplary aircraft hybrid worm gas turbine engine with a worm high pressure compressor.
Figure 14:
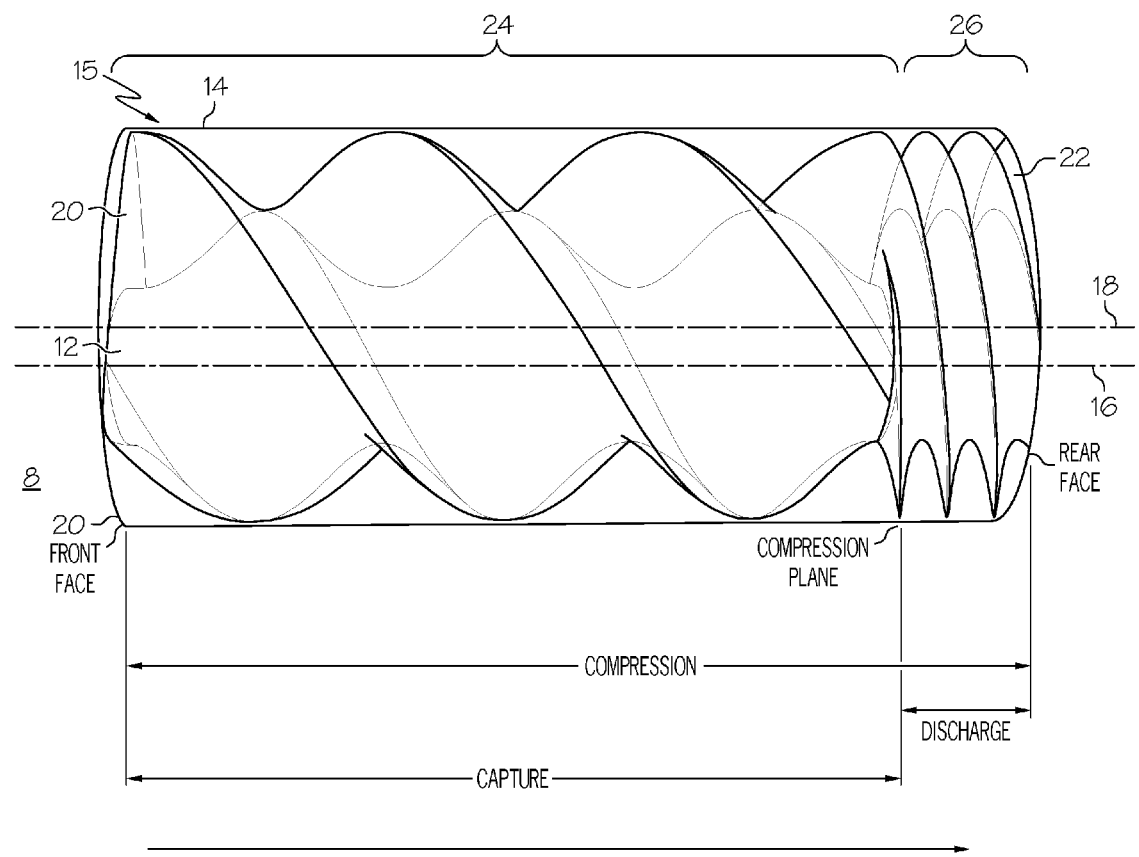
FIG. 14 is a diagrammatic cross-sectional view illustration of a worm downstream section of a high pressure compressor illustrated in FIG. 13.
Figure 15:
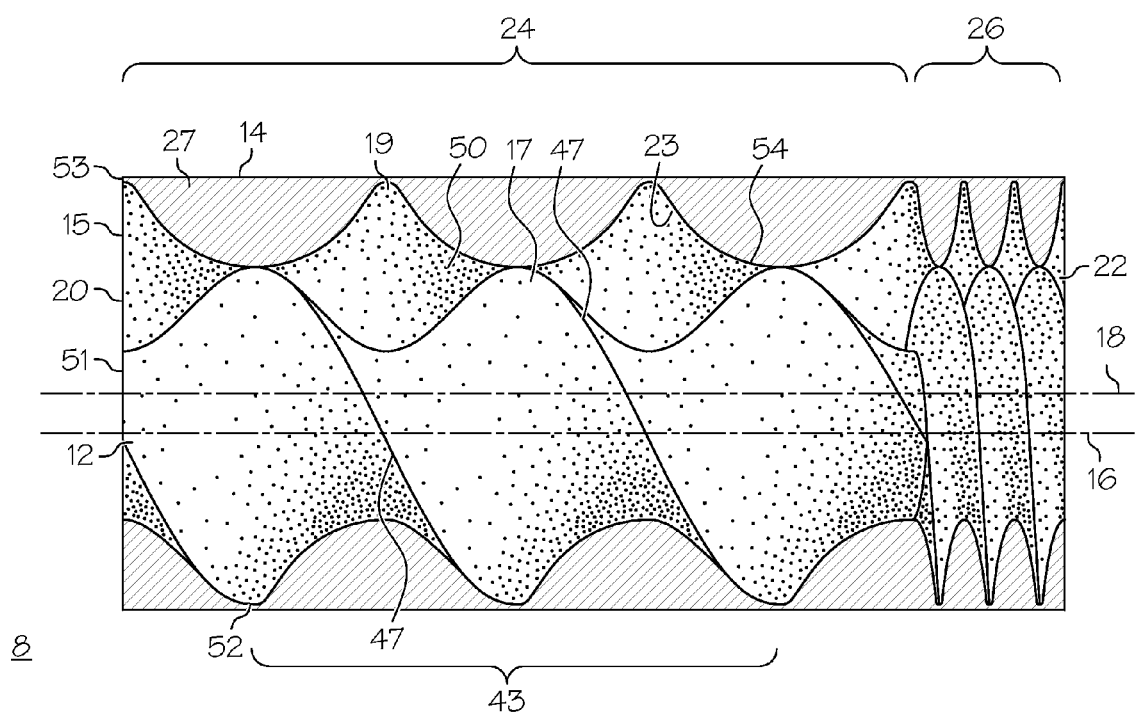
FIG. 15 is a diagrammatic partially cut away perspective view illustration of helical blade portions of inner and outer bodies of the worm downstream section of the high pressure compressor illustrated in FIG. 14.
Figure 16:
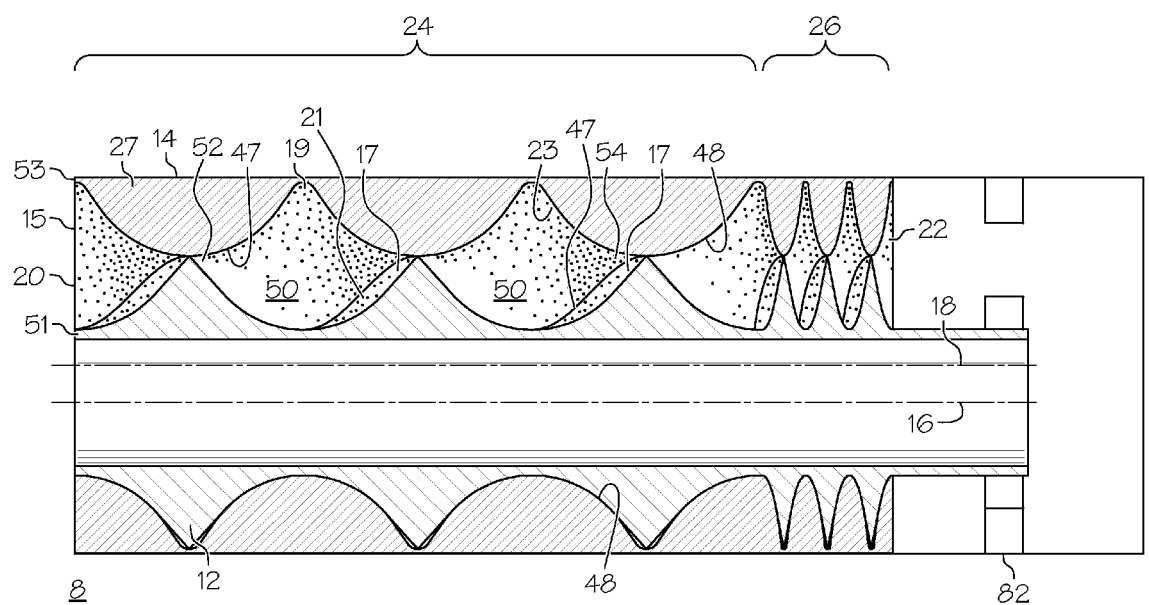
FIG. 16 is a diagrammatic cross-sectional view illustration of gearing between inner and outer bodies of the worm downstream section of the high pressure compressor illustrated in FIG. 14.
Figure 17:
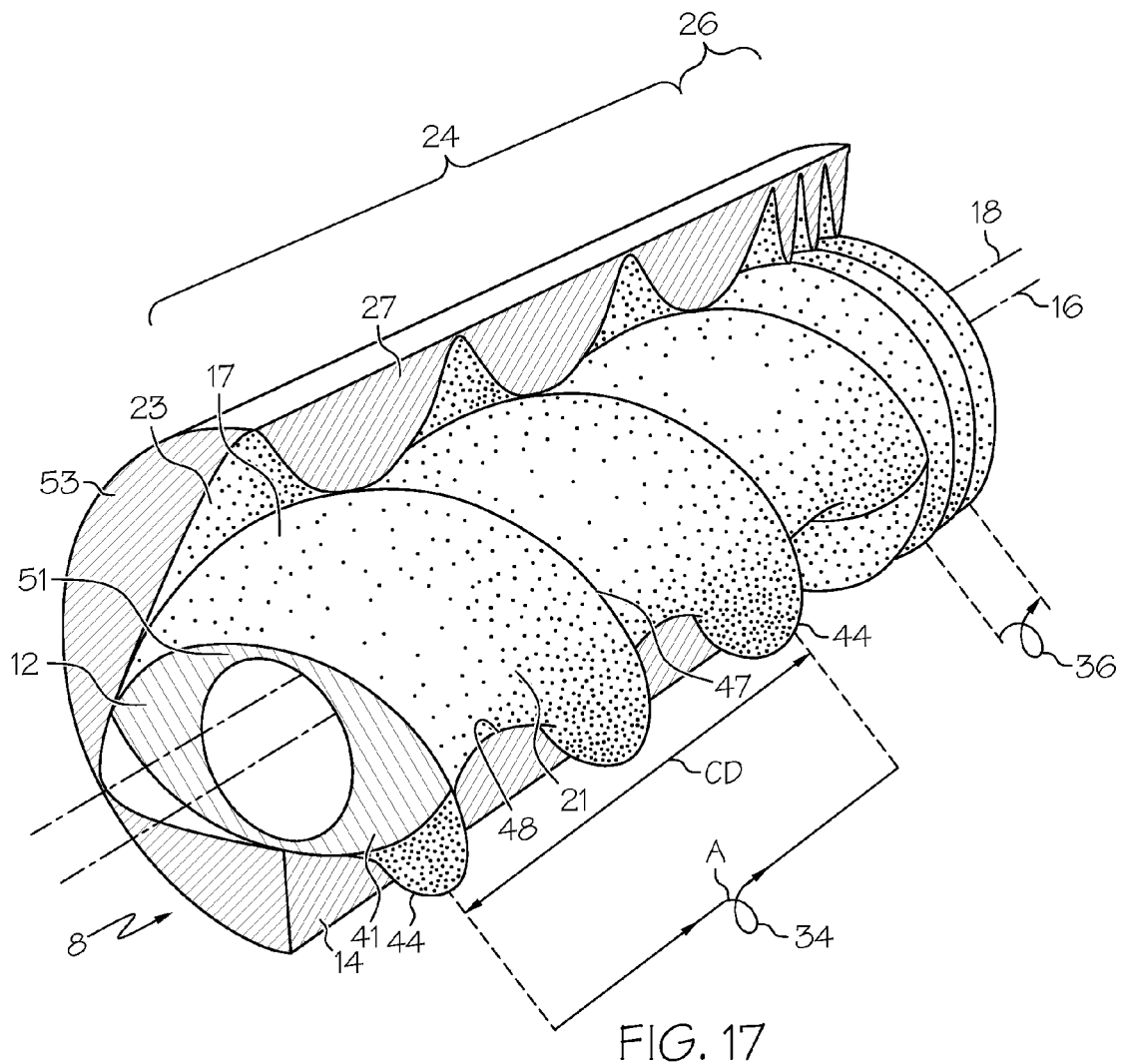
FIG. 17 is a diagrammatic cut away perspective view illustration of the helically bladed portions of the inner and outer bodies of the worm downstream section of the high pressure compressor illustrated in FIG. 16.

The embodiment of the aircraft hybrid worm gas turbine engine illustrated in FIG. 13 includes the fan 108 in the fan section 112 of the engine 100 and a radially bladed low pressure compressor 8 that are powered by a radially bladed low pressure turbine 120 through the low pressure shaft 132. The high pressure compressor 6 has both a radially bladed upstream section 45 and a worm downstream section 46. The upstream section 45 has high pressure compressor blades 13 and the downstream section 46 is the worm component 210 of the engine 100. The combustor 7 is operably disposed between the worm downstream section 46 and the radially bladed high pressure turbine 9 having the high pressure turbine blades 11. The high pressure turbine 9 is drivingly connected to the radially bladed upstream section 45 and the worm downstream section 46 of the high pressure compressor 6 by a high pressure shaft 5.

Fluid exhausted from the radially bladed upstream section 45 enters the worm downstream section 46 of the high pressure compressor 6, where it is axially compressed and decelerated to a low mach number at an inlet to the combustor 7. Depending on the compression potential of the worm high compressor component, the worm downstream section 46, the use of the radially bladed upstream section 45 may not be necessary. The off-design operating characteristics of the worm compressor might require controllable area turbine nozzles 49 (CAT) for the high and low pressure turbines 9, 120 as illustrated in FIG. 1. In a two rotor or body worm compressor configuration in which both the inner and outer bodies 12, 14 rotate in the same direction, the faster of the two rotors or bodies is coupled to the high pressure turbine 9 by the high pressure shaft 5. Gearing together of the inner and outer bodies 12, 14 distributes power and retains an appropriate phasing between the bodies.

Illustrated in FIGS. 14-17 is the downstream section 46 or the worm component 210 of the engine 100 illustrated in FIG. 13. The worm component 210 has first and second sections 24, 26 in serial downstream flow relationship and provides continuous flow through the inlet 20 and the outlet 22 during operation of the engine 100. Individual charges of air 50 are captured in and by the first section 24. Compression of the charges 50 occurs as the charges 50 pass from the first section 24 to the second section 26. Thus, an entire charge 50 undergoes compression while it is in both the first and second sections 24, 26, respectively.

The twist slope A of the inner element in each of the sections is different from the twist slope A of the outer element. The ratio of the twist slope A of the outer body 14 to the twist slope A of the inner body 12 is equal to the ratio of the number of inner helical blades 17 blades on the inner body 12 to the number of outer helical blades 27 blades on the outer body 14. The first twist slopes 34 are less than the second twist slopes 36. One might also describe the helical elements in terms of helical angle. The helical elements have constant first and second helical angles corresponding to the constant first and second twist slopes 34, 36, in the first and second sections 24, 26, respectively, in much the same way one would describe a screw in terms of pitch and pitch angle.

The inner helical blade 17 in the first section 24 has a sufficient number of turns 43 to trap the charges of air 50 in the first section 24 during the generator's operation. The trapped charges of air 50 allow positive displacement compression so that higher pressures developed downstream cannot force air or the charges back out the inlet 20. In one embodiment of the downstream section 46 or worm component 210 of the high pressure compressor 6, the number of turns 43 in the first section 24 is sufficient to mechanically trap the charges of air 50. In another embodiment, the number of turns 43 in the first section 24 is sufficient to dynamically trap the charges of air 50.

Mechanically trapped means that the charge 50 is trapped by being closed off from the inlet 20 at an upstream end 52 of the charge 50 before it passes into the second section 26 at a downstream end 54 of the charge 50. Dynamically trapped means that though the downstream end 54 of the trapped charge may have passed into the second section 26, the upstream end 52 of the charge has not yet completely closed. However, at its downstream end 54, by the time a pressure wave from the second section travels to the inlet 20, relative rotation between the bodies will have closed off the trapped charge of air 50 at its upstream end 52.

An engine with a high bypass ratio and a LPC driven directly by the LPT shaft may result in a combination of rotational speed and LPC pitchline radius limiting the amount of compression available with a reasonable number of stages. This leaves the remainder of the compression process to the HPC. An upper limit on HPC compression in current axial flow compressor technology results from the diminishing physical dimensions of the compressor at pressure. As density of the working fluid increases, passage height required to maintain a diffusible flow velocity decreases. Accordingly, the ratio of passage height to rotor clearance decreases and the efficiency of the machine decreases. Historically, this effect begins to trade unfavorably at or near a total pressure ratio of 25:1.

The worm compressor achieves compression by a reduction in axial dimensions, leaving the passage height unaltered. The mach number of flow traversing the worm compressor does diminish, but the compression process isn't dependent on the repeated infusion of rotational kinetic energy and subsequent diffusion to increase internal energy, as is the case for a conventional compressor. As a consequence, the worm compressor may be capable of taking the discharge from a conventional HPC and continuing the compression process to a higher state than was previously attainable. It may be capable of replacing the HPC altogether as a means of achieving higher overall pressure ratios than previously attainable. It should be noted that elevated overall pressure ratio is only an enabling technology to a more fuel efficient engine. In most cases, it must be accompanied by increased turbine inlet temperature capability to yield a more fuel efficient engine. Upper limits to worm compression are thought to be related to helical blade thickness near the rotor tips in the discharge region of the compressor. The higher the compression ratio, the thinner the discharge blade thickness.

Currently, as a turbofan engine slows from max power, the specific fuel consumption (SFC) of the engine first decreases as component and propulsive efficiencies improve, and then rapidly increases as the thermal efficiency of the core diminishes. The loss in thermal efficiency is due to both part power reductions in compressor pressure ratio and turbine inlet temperature. Compression loss is the dominant effect. The positive displacement characteristic of nearly constant pressure ratio with varying speed may lead to improved thermal efficiency at part power, and subsequently to part power SFC reduction. Controllable area turbine nozzles probably will be required of conventional turbines downstream of a worm compressor. The amount of flow function variation available from CAT nozzle technology may limit full exercise of this capability in the near term.

Figure 18:
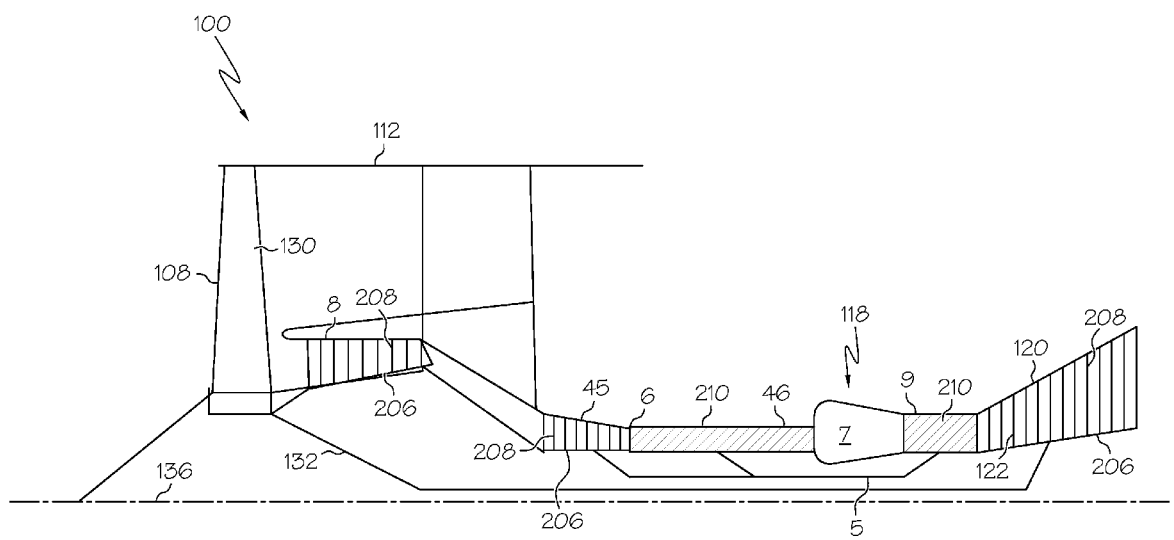
FIG. 18 is a diagrammatic cross-sectional view illustration of an exemplary aircraft hybrid worm gas turbine engine with a worm high pressure compressor and a worm high pressure turbine.

Illustrated in FIG. 18 is a diagrammatic cross-sectional view illustration of an exemplary aircraft hybrid worm gas turbine engine with a worm high pressure compressor 6 downstream section 46 and a worm high pressure turbine 9. The embodiment of the aircraft hybrid worm gas turbine engine illustrated in FIG. 18 includes the fan 108 in the fan section 112 of the engine 100 and a radially bladed low pressure compressor 8 that are powered by a radially bladed low pressure turbine 120 through the low pressure shaft 132. The high pressure compressor 6 has both a radially bladed upstream section 45 and a worm downstream section 46. The upstream section 45 has high pressure compressor blades 13 and the downstream section 46 is a first worm component 210 of the engine 100. The combustor 7 is operably disposed between the worm downstream section 46 and a worm high pressure turbine 9. The worm high pressure turbine 9, a second worm component 210 of the engine 100, is drivingly connected to the radially bladed upstream section 45 and the worm downstream section 46 of the high pressure compressor 6 by a high pressure shaft 5. The use of a worm high pressure turbine 9 might eliminate the need for controllable area turbine nozzles 49 for the high and low pressure turbines 9, 120.

Figure 19:
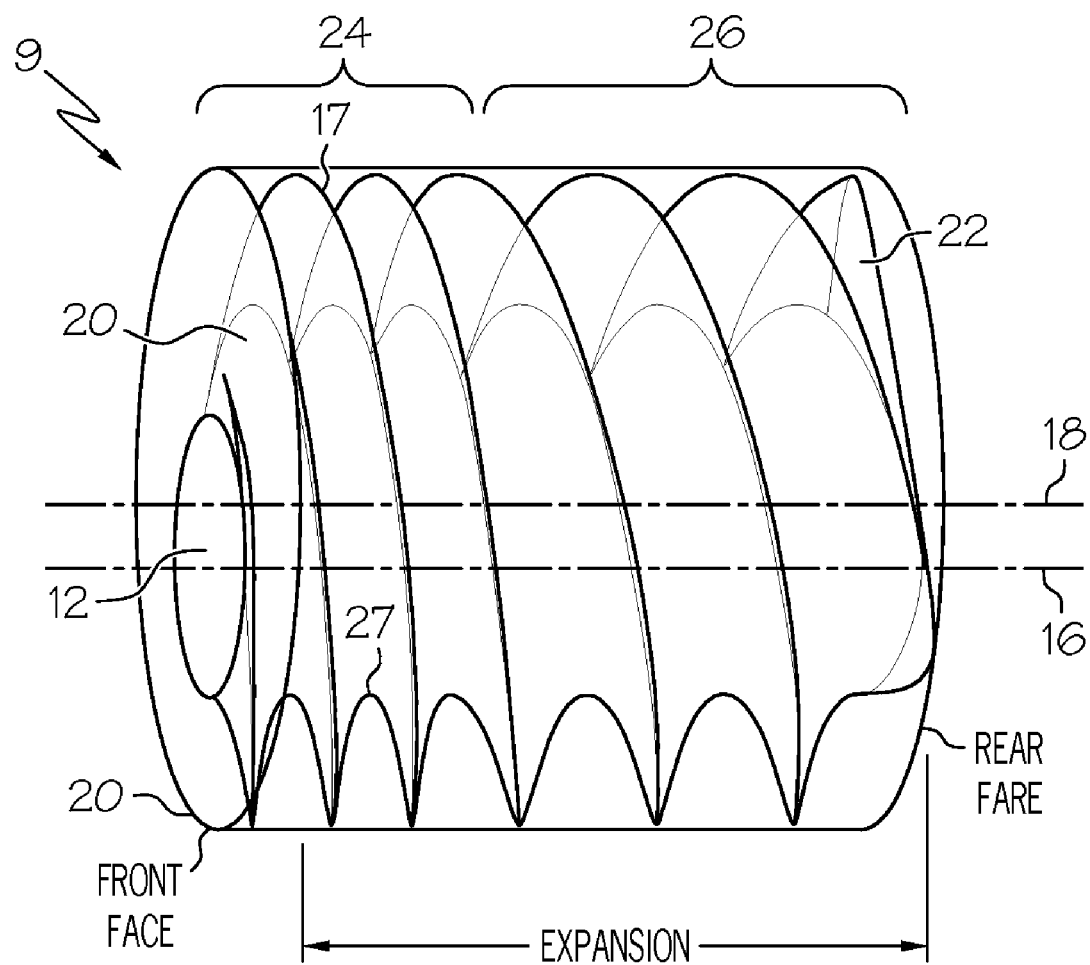
FIG. 19 is a diagrammatic cross-sectional view illustration of the inner and outer bodies of the worm high pressure turbine illustrated in FIG. 18.

Illustrated in FIG. 19 is the worm high pressure turbine 9, one of the worm components of the engine 100 illustrated in FIG. 18. The worm high pressure turbine 9 has first and second sections 24, 26 in serial downstream flow relationship and provides continuous flow through the inlet 20 and the outlet 22 during operation of the engine 100. The worm high pressure turbine 9 is an expansion section of the engine and expansion may begin in the first section 24 as indicated in FIG. 19 and continue on through the second section 26. The charge 50 is captured in the first section 24 and expansion of the charges 50 occurs as the charges 50 passes into the second section 26. Thus, the entire charge 50 may undergo expansion while it is in both the first and second sections 24, 26.

The twist slope of the inner helical blades 17 is different from the twist slope of the outer helical blades 27 in each of the sections. The ratio of the twist slope of the outer helical blades 27 to the twist slope of the inner helical blades 17 is equal to the ratio of the number of inner helical blades 17 blades on the inner body 12 to the number of outer helical blades 27 blades on the outer body 14. The first twist slopes are less than the second twist slopes in the first and second sections 24, 26. One might also describe the helical elements in terms of helical angle. The helical elements have constant first and second helical angles corresponding to the constant first and second twist slopes in the first and second sections 24, 26, respectively, in much the same way one would describe a screw in terms of pitch and pitch angle.

The hybrid gas generator with a worm compressor and worm turbine exhibits fundamentally the same benefits as a worm compressor gas generator. However, because the high pressure worm turbine flow function diminishes at reduced corrected speed, a CAT nozzle may not be required. Also, by mechanically coupling the inner rotor of the HPC with the inner rotor of the HPT, and likewise for the outer rotor, the power transmission requirements of gearing between the inner and outer rotors should be greatly diminished.

Figure 20:
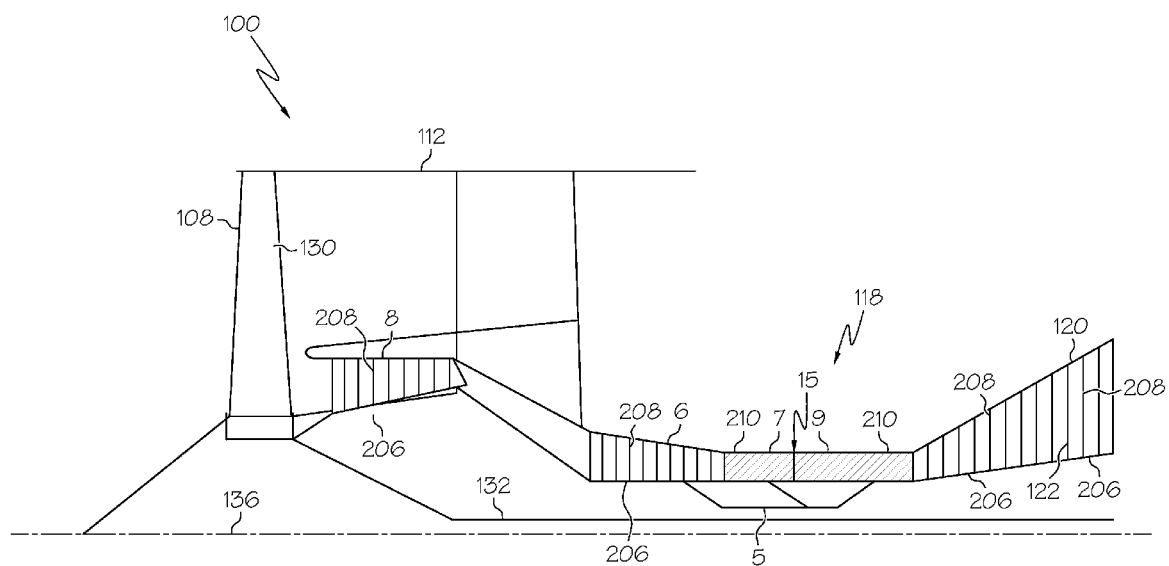
FIG. 20 is a diagrammatic cross-sectional view illustration of an exemplary aircraft hybrid worm gas turbine engine with a worm combustor and a worm high pressure turbine.

Illustrated in FIG. 20 is a diagrammatic cross-sectional view illustration of an exemplary aircraft hybrid worm gas turbine engine 100 with a worm combustion section and a worm high pressure turbine section. The embodiment of the aircraft hybrid worm gas turbine engine illustrated in FIG. 20 includes the fan 108 in the fan section 112 of the engine 100 and a radially bladed low pressure compressor 8 that are powered by a radially bladed low pressure turbine 120 through the low pressure shaft 132. The high pressure compressor 6 is radially bladed having rows of high pressure compressor blades 13. The combustor 7 is a worm combustor operably disposed between the radially bladed high pressure compressor 6 and a worm high pressure turbine 9. The worm combustor 7 and the worm high pressure turbine 9 are integral and both are worm components 210 of the engine 100. Both the radially bladed high pressure compressor 6 and the worm combustor 7 require work to be input and are powered and driven by the worm high pressure turbine 9 through the high pressure shaft 5.

The hybrid gas generator with a worm combustor and worm turbine offers the potential to perform constant volume combustion in the worm combustor followed by isenthalpic combustion-expansion in the worm turbine. This process results in a thermodynamic cycle, termed the Murrow cycle, offering substantial performance benefits over the conventional turbine gas generator Brayton cycle. The faster of the two rotors in the worm burner and worm turbine are mated to the HPC upstream. Gases expanded in the worm turbine should provide sufficient power for the worm burner and a radially bladed compressor. Alternatively, the worm turbine could be designed to extract only enough power to drive the worm burner, and an HPT independently coupled to the HPC could be used to drive the LPC. The resulting integral worm burner and worm turbine combination would behave as a pressure rise combustor, with zero net shaft work.

Figure 21:
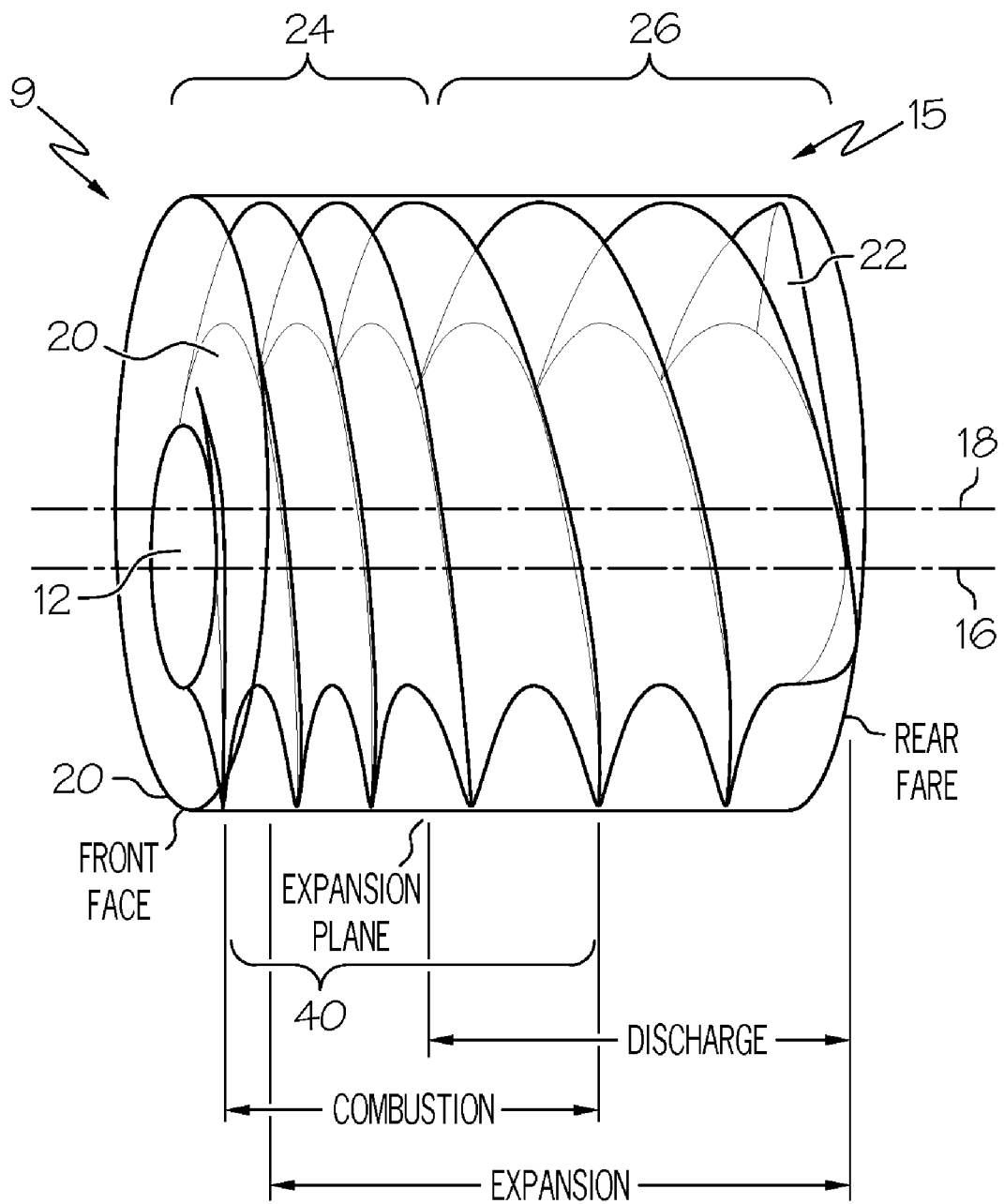
FIG. 21 is a diagrammatic cross-sectional view illustration of the inner and outer bodies of the worm combustor and the worm high pressure turbine illustrated in FIG. 20.

Illustrated in FIG. 21 is an integral assembly 15 including the worm combustor 7 and the worm high pressure turbine 9, the two worm components of the engine 100 illustrated in FIG. 20, having common inner and outer axes 16, 18. The integral assembly 15 has first and second sections 24, 26 in serial downstream flow relationship and provides continuous flow through the inlet 20 and the outlet 22 during operation of the engine 100. A combustor section 40 extends axially downstream through at least a portion of the first section 24. As illustrated herein, the combustor section 40 extends axially downstream from the end of the inlet 20 of the integral assembly 15 through the first section 24. Combustion begins in the first section 24 after the entire charge 50 has been captured therein the combustion in the first section 24 is constant volume combustion. The integral assembly 15 and the combustor section 40 may be configured so that the combustor section 40 extends axially downstream through at least a portion of the second section 26 as well.

Figure 22:
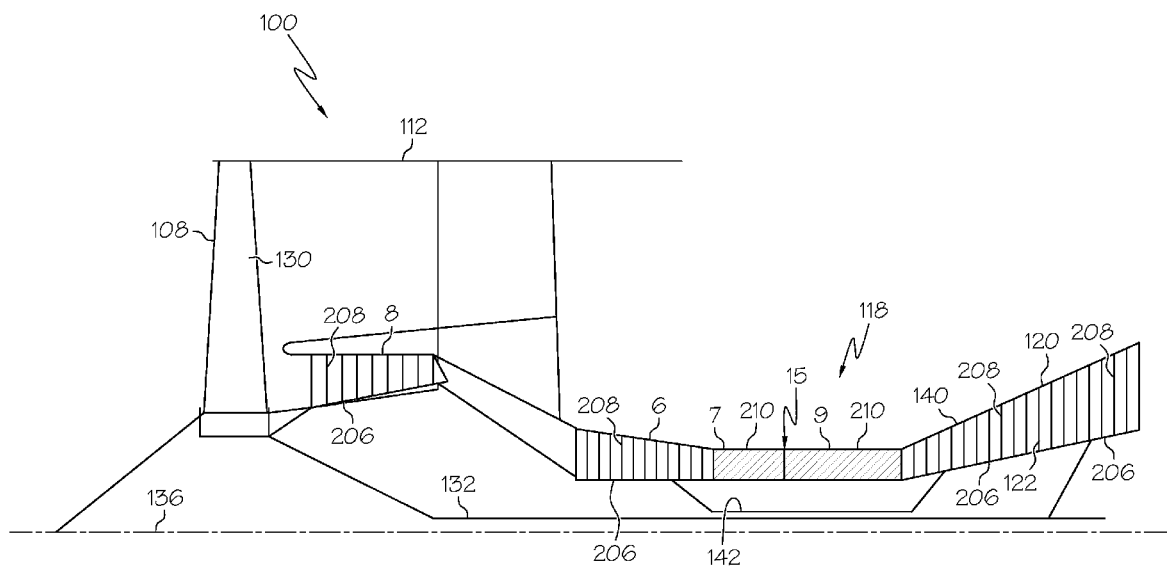
FIG. 22 is a diagrammatic cross-sectional view illustration of an exemplary triple spool aircraft hybrid worm gas turbine engine with a combination radially bladed and worm high pressure compressor and a worm combustor.

Illustrated in FIG. 22 is a diagrammatic cross-sectional view illustration of an exemplary triple spool aircraft hybrid worm gas turbine engine 100 with a combination radially bladed and worm high pressure compressor and a worm combustor high pressure turbine section. The embodiment of the aircraft hybrid worm gas turbine engine illustrated in FIG. 22 is similar to the one illustrated in FIG. 20 the major difference being that the embodiment illustrated in FIG. 20 is a dual spool engine and the embodiment illustrated in FIG. 22 is a triple spool engine. The triple spool engine embodiment illustrated in FIG. 22 includes a low pressure spool including the fan 108 in the fan section 112 of the engine 100 powered by a radially bladed low pressure turbine 120 through a low pressure shaft 132. A second or intermediate pressure spool includes a radially bladed low pressure compressor 8 powered by a radially bladed intermediate pressure turbine 140 through an intermediate pressure shaft 142. The high pressure compressor 6 is radially bladed having rows of high pressure compressor blades 13. The combustor 7 is a worm combustor operably disposed between the radially bladed high pressure compressor 6 and a worm high pressure turbine 9. The worm combustor 7 and the worm high pressure turbine 9 are integral as are their inner bodies and outer bodies respectively and both are worm components 210 of the engine 100. The worm combustor 7 requires work to be input and is powered and driven by the worm high pressure turbine 9 which is integral with the worm combustor 7 in what is referred to as a third or high pressure spool.

Illustrated in FIG. 22, is an integral assembly 15 including the worm combustor 7 and the worm high pressure turbine 9, the two worm components of the engine 100, as illustrated in FIG. 21 and discussed above. The integral assembly 15 has first and second sections 24, 26 in serial downstream flow relationship and provides continuous flow through the inlet 20 and the outlet 22 during operation of the engine 100. A combustor section 40 extends axially downstream through at least a portion of the first section 24. As illustrated herein the combustor section 40 extends axially downstream from the end of the inlet 20 of the integral assembly 15 through the first section 24. Combustion begins in the first section 24 after the entire charge 50 has been captured therein the combustion in the first section 24 is constant volume combustion. The integral assembly 15 and the combustor section 40 may be configured so that the combustor section 40 extends axially downstream through at least a portion of the second section 26 as well.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine comprising:
   at least three gas turbine engine components including in downstream flow relationship a compressor, a combustor, and a turbine;
   at least a first one of the gas turbine engine components being a radially bladed component having at least one row of radially extending rotatable blades;
   at least a second one of the gas turbine engine components being a worm component;
   the worm component including an inlet axially spaced apart and upstream from an outlet, an inner body disposed within an outer body, and the inner and outer bodies extending from the inlet to the outlet;
   the inner and outer bodies having offset inner and outer axes respectively;
   at least one of the inner and outer bodies being rotatable about a corresponding one of the inner and outer axes;
   the inner and outer bodies having intermeshed inner and outer helical blades wound about the inner and outer axes respectively; and
   the inner and outer helical blades extending radially outwardly and inwardly respectively.

2. An engine as claimed in claim 1 further comprising the outer body being rotatable about the outer axis and the inner body and being rotatable about the inner axis.

3. An engine as claimed in claim 2 further comprising the inner and outer bodies being geared together in a fixed gear ratio.

4. An engine as claimed in claim 1 further comprising the inner and outer bodies being geared together in a fixed gear ratio.

5. An engine as claimed in claim 4 further comprising the outer body being rotatably fixed about the outer axis and the inner body being orbital about the outer axis.

6. An aircraft gas turbine engine comprising:
   gas turbine engine components including in serial downstream flow relationship a fan, a low pressure compressor, a high pressure compressor, a combustor, a high pressure turbine, and a low pressure turbine;
   the gas turbine engine components including one or more radially bladed components and one or more helically bladed worm components;
   each of the radially bladed components having at least one row of radially extending rotatable blades;
   each of the worm components including an inlet axially spaced apart and upstream from an outlet, an inner body disposed within an outer body, and the inner and outer bodies extending from the inlet to the outlet;
   the inner and outer bodies having offset inner and outer axes respectively;
   at least one of the inner and outer bodies being rotatable about a corresponding one of the inner and outer axes;
   the inner and outer bodies having intermeshed inner and outer helical blades wound about the inner and outer axes respectively; and
   the inner and outer helical blades extending radially outwardly and inwardly respectively.

7. An engine as claimed in claim 6 further comprising the outer body being rotatable about the outer axis and the inner body and being rotatable about the inner axis.

8. An engine as claimed in claim 7 further comprising the inner and outer bodies being geared together in a fixed gear ratio.

9. An engine as claimed in claim 6 further comprising the inner and outer bodies being geared together in a fixed gear ratio.

10. An engine as claimed in claim 9 further comprising the outer body being rotatably fixed about the outer axis and the inner body being orbital about the outer axis.

11. An engine as claimed in claim 6 further comprising the low pressure compressor being helically bladed.

12. An engine as claimed in claim 11 further comprising the fan, the high pressure compressor, the high pressure turbine, and the low pressure turbine being radially bladed.

13. An engine as claimed in claim 12 further comprising the outer body being rotatable about the outer axis and the inner body and being rotatable about the inner axis.

14. An engine as claimed in claim 13 further comprising the inner and outer bodies being geared together in a fixed gear ratio.

15. An engine as claimed in claim 11 further comprising the inner and outer bodies being geared together in a fixed gear ratio.

16. An engine as claimed in claim 15 further comprising the outer body being rotatably fixed about the outer axis and the inner body being orbital about the outer axis.

17. An engine as claimed in claim 6 further comprising the high pressure compressor including a radially bladed upstream section and a worm helically bladed downstream section and the high pressure turbine being radially bladed and drivingly connected to the upstream and downstream sections.

18. An engine as claimed in claim 17 further comprising the fan, the low pressure compressor, and the low pressure turbine being radially bladed.

19. An engine as claimed in claim 18 further comprising the outer body being rotatable about the outer axis and the inner body and being rotatable about the inner axis.

20. An engine as claimed in claim 19 further comprising the inner and outer bodies being geared together in a fixed gear ratio.

21. An engine as claimed in claim 17 further comprising the inner and outer bodies being geared together in a fixed gear ratio.

22. An engine as claimed in claim 21 further comprising the outer body being rotatably fixed about the outer axis and the inner body being orbital about the outer axis.

23. An engine as claimed in claim 6 further comprising:
   the high pressure compressor including a radially bladed upstream section and a worm helically bladed downstream section,
   the high pressure turbine being helically radially bladed and drivingly connected to the upstream and downstream sections, and
   the downstream section and the high pressure turbine being the worm components.

24. An engine as claimed in claim 23 further comprising the fan, the low pressure compressor, and the low pressure turbine being radially bladed.

25. An engine as claimed in claim 24 further comprising the outer body being rotatable about the outer axis and the inner body and being rotatable about the inner axis.

26. An engine as claimed in claim 25 further comprising the inner and outer bodies being geared together in a fixed gear ratio.

27. An engine as claimed in claim 23 further comprising the inner and outer bodies being geared together in a fixed gear ratio.

28. An engine as claimed in claim 27 further comprising the outer body being rotatably fixed about the outer axis and the inner body being orbital about the outer axis.

29. An engine as claimed in claim 6 further comprising the combustor and the high pressure turbine being helically bladed and drivingly connected to the high pressure compressor and the combustor, and the combustor and the high pressure turbine being the worm components.

30. An engine as claimed in claim 29 further comprising the fan, the low pressure compressor, the high pressure compressor, and the low pressure turbine being radially bladed.

31. An engine as claimed in claim 30 further comprising the outer body being rotatable about the outer axis and the inner body and being rotatable about the inner axis.

32. An engine as claimed in claim 31 further comprising the inner and outer bodies being geared together in a fixed gear ratio.

33. An engine as claimed in claim 29 further comprising the inner and outer bodies being geared together in a fixed gear ratio.

34. An engine as claimed in claim 33 further comprising the outer body being rotatably fixed about the outer axis and the inner body being orbital about the outer axis.

35. An engine as claimed in claim 6 further comprising:
the combustor being helically bladed,
the high pressure turbine being helically bladed and drivingly connected to the combustor,
the combustor and the high pressure turbine being the worm components,
the high pressure compressor drivingly connected to an intermediate pressure turbine disposed in flow relationship between the low pressure turbine and the high pressure turbine, and
the fan and the low pressure compressor drivingly connected to the low pressure turbine.

36. An engine as claimed in claim 35 further comprising the fan, the low pressure compressor, the high pressure compressor, the low pressure turbine, and the intermediate pressure turbine being radially bladed.

37. An engine as claimed in claim 36 further comprising the outer body being rotatable about the outer axis and the inner body and being rotatable about the inner axis.

38. An engine as claimed in claim 37 further comprising the inner and outer bodies being geared together in a fixed gear ratio.

39. An engine as claimed in claim 35 further comprising the inner and outer bodies being geared together in a fixed gear ratio.

40. An engine as claimed in claim 39 further comprising the outer body being rotatably fixed about the outer axis and the inner body being orbital about the outer axis.

41. An engine as claimed in claim 6 further comprising:
the worm component being an integral assembly including the combustor and the high pressure turbine extending axially downstream from the inlet to the outlet,
the high pressure turbine being drivingly connected to the combustor,
the high pressure compressor drivingly connected to an intermediate pressure turbine disposed in flow relationship between the low pressure turbine and the high pressure turbine, and
the fan and the low pressure compressor drivingly connected to the low pressure turbine.

42. An engine as claimed in claim 41 further comprising the fan, the low pressure compressor, the high pressure compressor, the intermediate pressure turbine, and the low pressure turbine being radially bladed.

43. An engine as claimed in claim 42 further comprising the outer body being rotatable about the outer axis and the inner body and being rotatable about the inner axis.

44. An engine as claimed in claim 43 further comprising the inner and outer bodies being geared together in a fixed gear ratio.

45. An engine as claimed in claim 41 further comprising the inner and outer bodies being geared together in a fixed gear ratio.

46. An engine as claimed in claim 45 further comprising the outer body being rotatably fixed about the outer axis and the inner body being orbital about the outer axis.

* * * * *